(12) United States Patent
Xie

(10) Patent No.: US 12,041,346 B2
(45) Date of Patent: Jul. 16, 2024

(54) 4G AUDIO AND VIDEO CAPTURE EQUIPMENT BASED ON UVC DATA TRANSMISSION

(71) Applicant: SHENZHEN YANNUODA SCIENCE & TECHNOLOGY CO., LTD., Shenzhen (CN)

(72) Inventor: Yongqi Xie, Shenzhen (CN)

(73) Assignee: SHENZHEN YANNUODA SCIENCE & TECHNOLOGY CO., LTD., Shenzhen (CN)

( * ) Notice: Subject to any disclaimer, the term of this patent is extended or adjusted under 35 U.S.C. 154(b) by 219 days.

(21) Appl. No.: 17/399,598

(22) Filed: Aug. 11, 2021

(65) Prior Publication Data

US 2021/0377440 A1    Dec. 2, 2021

Related U.S. Application Data

(63) Continuation of application No. PCT/CN2019/090659, filed on Jun. 11, 2019.

(30) Foreign Application Priority Data

Feb. 19, 2019    (CN) .......................... 201910124053.7

(51) Int. Cl.
| H04N 23/66 | (2023.01) |
| H04N 23/60 | (2023.01) |
| H04N 23/63 | (2023.01) |
| H04N 23/80 | (2023.01) |
| H04W 84/04 | (2009.01) |

(52) U.S. Cl.
CPC ............ *H04N 23/665* (2023.01); *H04N 23/63* (2023.01); *H04N 23/80* (2023.01); *H04W 84/042* (2013.01)

(58) Field of Classification Search
CPC ...... H04N 23/665; H04N 23/63; H04N 23/80; H04W 84/042
See application file for complete search history.

(56) References Cited

U.S. PATENT DOCUMENTS

2014/0010282 A1* 1/2014 He ...................... H04N 19/187
375/240.02

FOREIGN PATENT DOCUMENTS

CN    108337418 A * 7/2018

* cited by examiner

*Primary Examiner* — Twyler L Haskins
*Assistant Examiner* — Fayez A Bhuiyan
(74) *Attorney, Agent, or Firm* — Zhigang Ma

(57) ABSTRACT

The present disclosure discloses a 4G audio and video capture equipment based on UVC data transmission, including an integrated circuit board, a data input and output interface, a UVC and UART communication system, an audio and video data capture module, and a 4G communication module, the data input and output interface is connected with the integrated circuit board, the audio and video data capture module and the 4G communication module are both mounted on the integrated circuit board, the audio and video capture module is bidirectionally connected with the 4G communication module through the UVC and UART communication system.

9 Claims, 4 Drawing Sheets

4G AUDIO AND VIDEO CAPTURE EQUIPMENT BASED ON UVC DATA TRANSMISSION

FIELD

The present disclosure relates to the technical field of audio and video capture equipment and 4G module, in particular to a 4G audio and video capture equipment based on UVC data transmission.

BACKGROUND

In a related art, the audio and video capture device is adopted as a main device to drive a 4G communication module through the standard USB communication protocol or the SDI0 communication protocol, for linking the data collection with background. In another related art, the linking function is related through a chip of traditional mobile phone, to output the audio and video data or allow another electronic product to receive the audio and video data.

At present, the 4G audio and video capture equipment is usually used in the following fields: 1. the 4G audio and video capture equipment is used as a first solution in audio and visual communication field of mobile phones, which is a relatively mature solution, while the disadvantages of the first solution are that the first solution focuses on the voice call system, and is not professional in video capture. In detail, the first solution is unable to perform video capture at low power consumption for a long time. And after a long time of continuous work, the chip of the mobile phone may be serious hot, which may greatly affect the expansion and extension of electronic products; 2. loading the 4G module with multimedia chip is used as a second solution, the second solution takes a multimedia chip as a main component, a 4G module as an auxiliary component, and loads a driver through a USB interface. The second solution has high requirement for front-end chip. The front-end chip mostly adopts the Linux system as the existing 4G module instruction set mostly adopts the Linux system, which brings a certain limitation. The 4G audio and video capture equipment should be designed to consider that the response speed of the electronic product must be fast, and the DSP chip must respond quickly to make the electronic product start-up within 4 seconds. For this reason, the present disclosure proposes a 4G video and audio acquisition device based on UVC data transmission.

SUMMARY

The purpose of the present disclosure is to provide a 4G audio and video capture equipment based on UVC data transmission, to solve the problems mentioned in the background.

In order to achieve the above purpose, the present disclosure provides the following technical solutions: a 4G audio and video capture equipment based on UVC data transmission, including an integrated circuit board a data input and output interface, a UVC and UART communication system, an audio and video data capture module, and a 4G communication module, the data input and output interface is connected with the integrated circuit board, the audio and video data capture module and the 4G communication module are both mounted on the integrated circuit board, the audio and video capture module is bidirectionally connected with the 4G communication module through the UVC and UART communication system.

Preferably, the audio and video data capture module includes a camera module configured for capturing image data, and an audio and video data processing system configured for processing audio and video data, encoding the audio and video data to form a video stream, and storing files, the camera module is bidirectionally connected with the audio and video data processing system.

Preferably, the audio and video data processing system includes an image processor, an audio capture component, an image display module, and a data storage module, the image processor is bidirectionally connected with the camera module and the audio capture component, an output end of the image processor is electrically connected to an input end of the image display module and an input end of the data storage module, and the image processor is configured to transmit the audio and video data to the 4G communication module in real time through the UVC and UART communication system.

Preferably, the 4G communication module includes a baseband transmitter, a power management unit, a main frequency transceiver, and a radio frequency communication function module, the baseband transmitter, the power management unit, the main frequency transceiver, and the radio frequency communication function module are combined to form the independent 4G communication module.

Preferably, the UVC and UART communication system includes a UVC protocol and UART communication protocol.

Preferably, the audio and video data capture module is configured to transmit data in real time through the UVC protocol and the 4G communication module.

Preferably, the audio and video data capture module is configured to transmit a mutual control instruction set through the UART communication protocol and the 4G communication module.

Preferably, after receiving the audio and video data, the 4G communication module is configured to communicate with a background via a 4G network and transmit the audio and video data.

Preferably, the background is configured to communicate with the 4G communication module, wake up the audio and video data capture module, and transmit an audio and video data stream.

Compared with the related art, the beneficial effects of the present disclosure include:

1. When the present disclosure is used, the audio and visual data capture module and the 4G communication module may be replaced easily as the audio and visual data capture module and the 4G communication module are parallel devices. So that, the audio and visual data capture module and the 4G communication module have a wide range of applicability and compatibility, and different types of audio and visual data capture modules and 4G communication modules can be replaced according to actual market needs.
2. When the present disclosure is used, the UVC and UART communication system can stability transmit the audio and visual digital signals in real-time in two directions. The audio and visual data capture module can transmit data streams to the 4G communication, and encode and decode the audio and visual data simultaneously, therefore the background can process data effectively and the stability and real-time performance of the capture equipment are also improved.
3. When the present disclosure is used, the energy consumption of the capture equipment is effectively reduced, as such the capture equipment can continue to work effectively for a long time, and adapt to various harsh environments, and greatly improve the market application field of the capture equipment and the reliability of the capture equipment.

4. When the present disclosure is used, it has a great role in promoting and catalyzing the 4G audio and visual products, so that the 4G audio and visual products can be further improved and marketized, which brings far-reaching auxiliary significance to the intelligent ecological chain.

In the figures: 1—integrated circuit board; 2—data input and output interface; 3—UVC and UART communication system; 4—audio and visual data capture module; 5—4G communication module; 6—camera module; 7—audio and visual data processing system; 8—baseband transmitter; 9—power management unit; 10—main frequency transceiver; 11—radio frequency communication function module; 12—UVC protocol; 13—UART communication protocol; 14—image processor; 15—audio capture component; 16—image display module; 17—data storage module.

DETAILED DESCRIPTION OF THE EMBODIMENTS

The technical solutions of the embodiments of the present disclosure will be clearly and completely described in the following with reference to the accompanying drawings. It is obvious that the embodiments to be described are only a part rather than all of the embodiments of the present disclosure. All other embodiments obtained by persons skilled in the art based on the embodiments of the present disclosure without creative efforts shall fall within the protection scope of the present disclosure.

Figure 1:
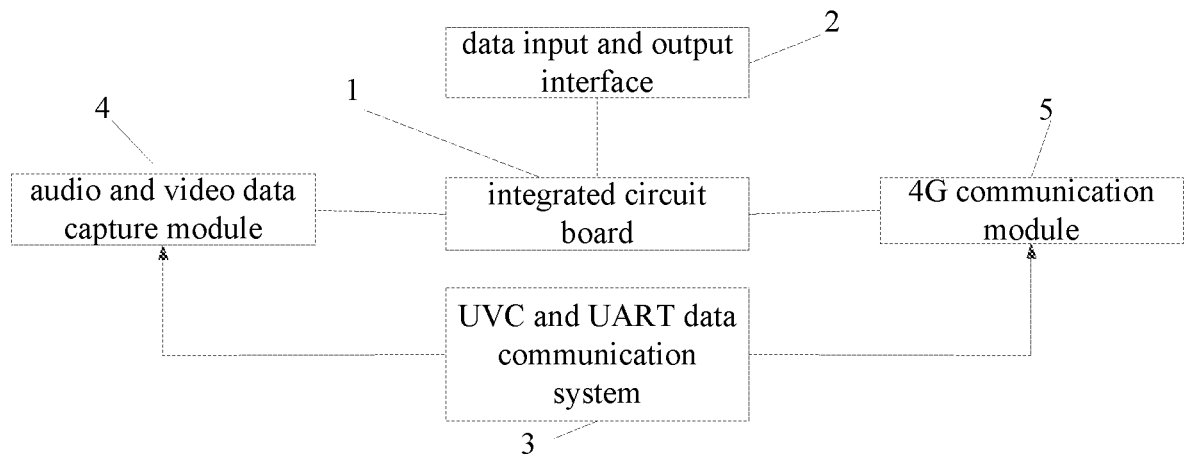
FIG. 1 is a schematic diagram of the connection relationships of the overall structure of the present disclosure.
Figure 2:
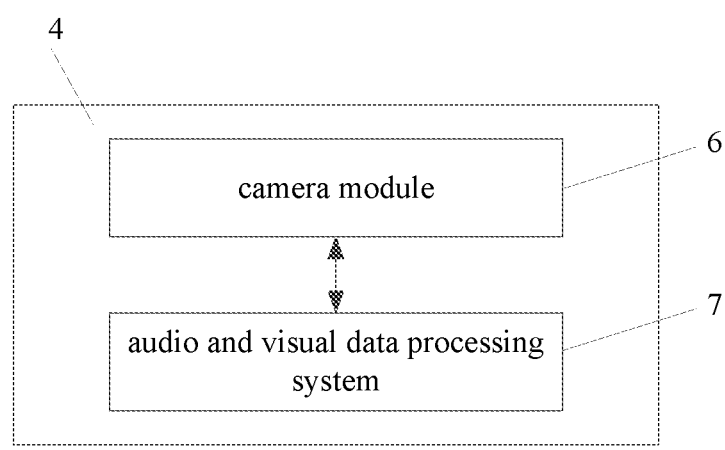
FIG. 2 is a structure schematic diagram of the audio and visual data capture module of the present disclosure.
Figure 3:
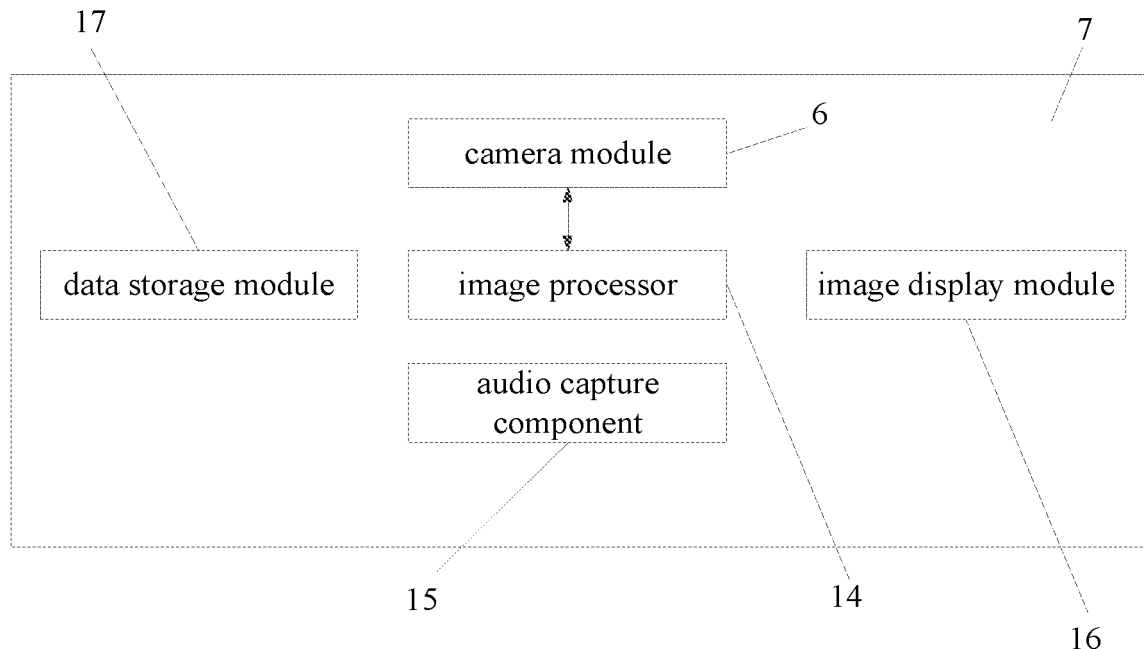
FIG. 3 is a structure schematic diagram of the audio and visual data processing system of the present disclosure.
Figure 4:
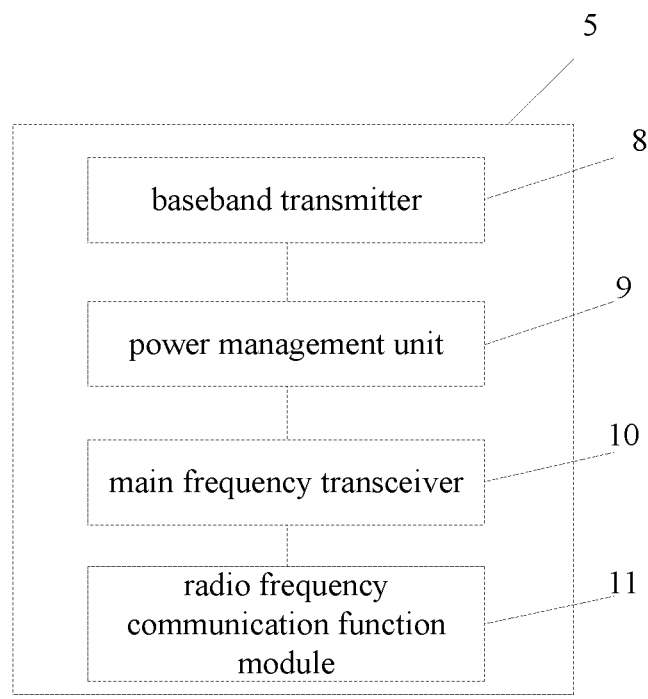
FIG. 4 is a structure schematic diagram of the 4G communication module of the present disclosure.
Figure 5:
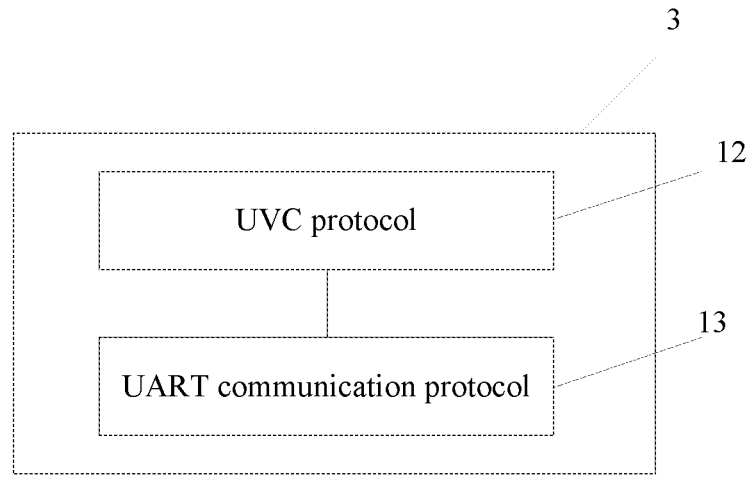
FIG. 5 is a structure schematic diagram of the UVC and UART communication system of the present disclosure.
Figure 6:
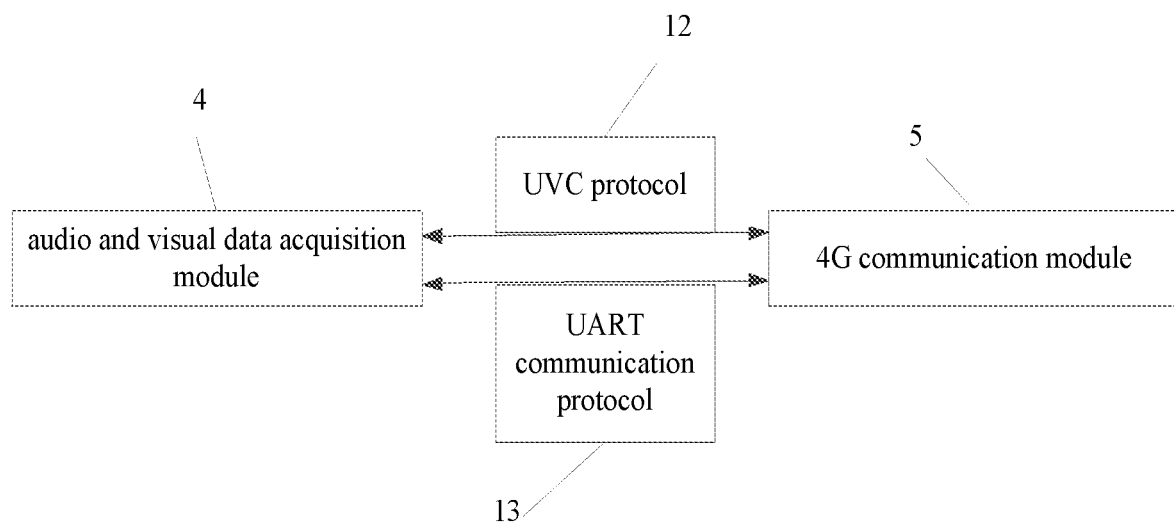
FIG. 6 is a schematic diagram of the connection relationship between the audio and visual data capture module and the 4G communication module of the present disclosure.
Figure 7:
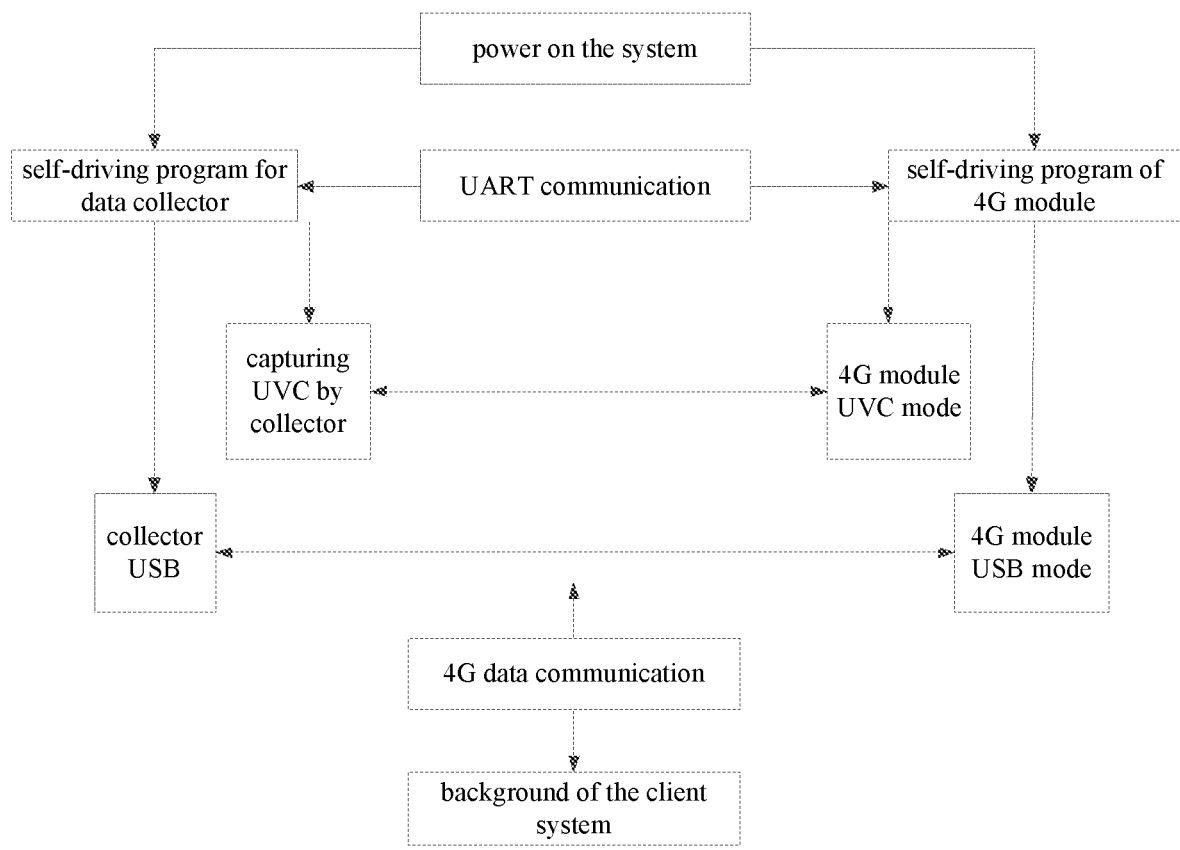
FIG. 7 is a schematic diagram of the overall data connection relationship of the present disclosure.

Please referring to FIGS. 1-7, the present disclosure provides a technical solution: a 4G audio and video capture equipment based on UVC data transmission includes an integrated circuit board 1, a data input and output interface 2, a UVC and UART communication system 3, an audio and video data capture module 4, and a 4G communication module 5, the data input and output interface 2 is connected with the integrated circuit board 1, the audio and video data capture module 4 and the 4G communication module 5 are both mounted on the integrated circuit board 1, the audio and video capture module 4 is bidirectionally connected with the 4G communication module 5 through the UVC and UART communication system 3.

In the present disclosure, the audio and visual data capture module 4 is self-driving, the 4G communication module 5 is self-driving synchronously. The audio and visual data capture module 4 and the 4G communication module 5 work separately and communicate with each other through the UVC and UART communication system 3, as such the audio and visual data capture module 4 may encode and decode audio and video data, and transmit the data stream to the 4G module 5 synchronously. In this way, the background may process data rapidly, and it is conducive to the replace the audio and video data capture module 4. In detail, it is conducive to the replace the audio and video data capture module 4 as the 4G module 5 can be adapted to various audio and video data capture modules 4.

The audio and video data capture module 4 includes a camera module 6 for collecting image data and an audio and video data processing system 7 for processing the audio and video data, and encoding the audio and video data to form a video stream, and storing files. The camera module 6 is bidirectionally connected with the audio and visual data processing system 7, so as to realize the rapidly acquire the image data.

In the present disclosure, the audio and visual data capture module 4 includes an image processor 14 and the camera module 6 which are defined as the main core components. The image processor 14 and the camera module 6 can also be combined with at least one component selected from a group consisting a sensor, a microphone, a speaker, a memory, a battery, a WIFI module, a central processing unit, a liquid crystal display, and so on, to form the independent audio and visual data capture module 4. So that the audio and visual data capture module 4 can quickly encode and decode the collected audio and visual data.

The audio and video data processing system 7 includes an image processor 14, an audio capture component 15, an image display module 16, and a data storage module 17, the image processor 14 is bidirectionally connected with the camera module 6 and the audio capture component 15, an output end of the image processor 14 is electrically connected to an input end of the image display module 16 and an input end of the data storage module 17, and the image processor 14 is configured to transmit the audio and video data to the 4G communication module 5 in real time through the UVC and UART communication system 3.

The 4G communication module 5 includes a baseband transmitter 8, a power management unit 9, a main frequency transceiver 10, and a radio frequency communication function module 11, the baseband transmitter 8, the power management unit 9, the main frequency transceiver 10, and the radio frequency communication function module 11 are combined to form the independent 4G communication module 5, thereby increasing the applicability of 4G communication module 5.

The UVC and UART communication system includes a UVC protocol 12 and a UART communication protocol 13, thereby improving the stability and real-time performance of the two-way transmission of audio and visual digital signals.

The audio and video data capture module 4 is configured to transmit data in real time through the UVC protocol 12 and the 4G communication module.

The audio and visual data capture module 4 transmits audio and visual data to the 4G communication module 5 in real-time through the UVC protocol, thereby stably transmitting audio and visual data.

The audio and visual data capture module 4 transmits a mutual control instruction set through the UART communication 13 and the 4G communication module 5, so as to realize the two-way transmission of audio and visual digital signals.

In the present invention, the audio and visual data capture module 4 collects data, and synchronously transmits the video stream to the 4G communication module 5. The 4G communication module 5 obtains information from the audio and visual data capture module 4 through the UVC protocol 12. At the same time, the data transmitting mode can be switched to USB transfer mode, so that it is convenient for the 4G communication module 5 to query and call related files and data in the audio and visual data capture module 4. The 4G communication module 5 uploads the digital signal to the background, and the background performs a derivative data processing, thereby improving the universality of the 4G communication module 5 and the cost-effectiveness of the audio and visual communication method.

After receiving the data, the 4G communication module 5 communicates with the background through 4G network and transmits the data to the background.

The background can communicate with the 4G communication module 5 to wake up the audio and visual data collection module 4 and transmit the audio and visual data stream.

It should be noted that, relational terms in the present disclosure, such as first and second, are only used to distinguish an entity or an operation from another entity or another operation, and do not necessarily mean or imply any actual relationship or order between these entities or operations. Moreover, the terms "comprising", "including" or other variants aim to cover non-exclusive inclusion, such that the processes, methods, articles or devices including a series of factors not only include these factors, but also include other factors not listed explicitly, or further include intrinsic for such processes, methods, articles or devices.

Although the embodiments of the present disclosure have been shown and described, it is apparent to those skilled in the art that a variety of changes, modifications, substitutions, and replacements may be made without departing from the scope of the present disclosure. The scope of the present disclosure is defined by the appended claims and their equivalents.

What is claimed is:

1. A 4G audio and video capture equipment based on UVC data transmission, comprising an integrated circuit board (1), a data input and output interface (2), a UVC and UART communication system (3), an audio and video data capture module (4), and a 4G communication module (5), wherein, the data input and output interface (2) is connected with the integrated circuit board (1), the audio and video data capture module (4) and the 4G communication module (5) are both mounted on the integrated circuit board (1), the audio and video capture module (4) is bidirectionally connected with the 4G communication module (5) through the UVC and UART communication system (3), the audio and visual data capture module (4) is self-driving, the 4G communication module (5) is self-driving synchronously, the audio and visual data capture module (4) and the 4G communication module (5) work separately and communicate with each other through the UVC and UART communication system (3), as such the audio and visual data capture module (4) encode and decode audio and video data, and transmit data stream to the 4G module (5) synchronously.

2. The 4G audio and video capture equipment based on UVC data transmission according to claim 1, wherein, the audio and video data capture module (4) comprises a camera module (6) configured for capturing image data, and an audio and video data processing system (7) configured for processing audio and video data, encoding the audio and video data to form a video stream, and storing files, the camera module (6) is bidirectionally connected with the audio and video data processing system (7).

3. The 4G audio and video capture equipment based on UVC data transmission according to claim 2, wherein, the audio and video data processing system (7) comprises an image processor (14), an audio capture component (15), an image display module (16), and a data storage module (17), the image processor (14) is bidirectionally connected with the camera module (6) and the audio capture component (15), an output end of the image processor (14) is electrically connected to an input end of the image display module (16) and an input end of the data storage module (17), and the image processor (14) is configured to transmit the audio and video data to the 4G communication module (5) in real time through the UVC and UART communication system (3).

4. The 4G audio and video capture equipment based on UVC data transmission according to claim 1, wherein, the 4G communication module (5) comprises a baseband transmitter (8), a power management unit (9), a main frequency transceiver (10), and a radio frequency communication function module (11), the baseband transmitter (8), the power management unit (9), the main frequency transceiver (10), and the radio frequency communication function module (11) are combined to form the independent 4G communication module (5).

5. The 4G audio and video capture equipment based on UVC data transmission according to claim 1, wherein, the UVC and UART communication system comprises a UVC protocol (12) and UART communication protocol (13).

6. The 4G audio and video capture equipment based on UVC data transmission according to claim 5, wherein, the audio and video data capture module (4) is configured to transmit data in real time through the UVC protocol (12) and the 4G communication module (5).

7. The 4G audio and video capture equipment based on UVC data transmission according to claim 5, wherein, the audio and video data capture module (4) is configured to transmit a mutual control instruction set through the UART communication protocol (13) and the 4G communication module (5).

8. The 4G audio and video capture equipment based on UVC data transmission according to claim 1, wherein, after receiving the audio and video data, the 4G communication module (5) is configured to communicate with a background via a 4G network and transmit the audio and video data.

9. The 4G audio and video capture equipment based on UVC data transmission according to claim 8, wherein, the background is configured to communicate with the 4G communication module (5), wake up the audio and video data capture module (4), and transmit an audio and video data stream.

* * * * *